United States Patent
Yanagishita

(10) Patent No.: US 6,172,146 B1
(45) Date of Patent: Jan. 9, 2001

(54) HOT-MELT COMPOSITION AND A MODIFIED AROMATIC PETROLEUM RESIN USED THEREFOR

(75) Inventor: Hitoshi Yanagishita, Kanagawa (JP)

(73) Assignee: Nippon Petrochemicals, Co. Ltd., Tokyo (JP)

( * ) Notice: Under 35 U.S.C. 154(b), the term of this patent shall be extended for 0 days.

(21) Appl. No.: 08/983,330

(22) PCT Filed: May 27, 1997

(86) PCT No.: PCT/JP97/01769

§ 371 Date: Jan. 27, 1998

§ 102(e) Date: Jan. 27, 1998

(87) PCT Pub. No.: WO97/45485

PCT Pub. Date: Dec. 4, 1997

(30) Foreign Application Priority Data

May 28, 1996 (JP) .................................................. 8-133320

(51) Int. Cl.$^7$ ............................. C08L 71/08; C08L 57/02; C08G 65/40; C08F 240/00

(52) U.S. Cl. ............................ 524/77; 524/477; 524/486; 524/487; 524/490; 524/502; 526/290

(58) Field of Search ............................. 524/474, 77, 477, 524/486, 487, 490, 502; 526/212, 290

(56) References Cited

U.S. PATENT DOCUMENTS

| | | | |
|---|---|---|---|
| 3,896,069 | * 7/1975 | Kosaka et al. | 260/28.5 |
| 4,797,460 | 1/1989 | Davis . | |
| 4,857,617 | 8/1989 | Tanaka et al. . | |
| 5,080,978 | * 1/1992 | Kulzick et al. | 428/483 |
| 5,879,378 | * 3/1999 | Usui | 607/96 |

FOREIGN PATENT DOCUMENTS

| | | |
|---|---|---|
| 0 011 393 A1 | 5/1980 | (EP) . |
| WO 93/06143 | 4/1993 | (WO) . |

\* cited by examiner

*Primary Examiner*—David W. Wu
*Assistant Examiner*—Kelechi Egwim
(74) *Attorney, Agent, or Firm*—Hollander Law Firm, P.L.C.

(57) ABSTRACT

A hot melt composition comprising a specific ratio of: (a) an ethylene copolymer resin; (b) a modified aromatic petroleum resin having a specific weight-average molecular weight and produced by copolymerization using a Friedel-Crafts catalyst from a specific ratio of: (1) a polymerizable component of the thermal cracked oil fraction having boiling points in a specific range and obtained by the thermal cracking of petroleum hydrocarbons, and containing vinyltoluene and indene at specific contents, (2) a turpentine oil having a specific diene value, and (3) a phenol compound; and (c) a wax. It is possible to develop a hot melt composition having excellent heat stability and improved adhesion resistance to heat, which can be used as hot melt coating, printing ink, adhesive, and sealant, etc.

14 Claims, No Drawings

HOT-MELT COMPOSITION AND A MODIFIED AROMATIC PETROLEUM RESIN USED THEREFOR

TECHNICAL FIELD

The present invention relates to a hot melt composition, and a modified aromatic petroleum resin for hot melt composition used therefor, more specifically, to, for example, a hot melt composition having improved heat stability and adhesion resistance to heat when used as hot melt adhesive, and a modified aromatic petroleum resin for hot melt composition used therefor.

BACKGROUND ART

An example of prior art is disclosed in Japanese Patent Application Laid-open No. Sho 55-65248, which proposes that a modified aromatic petroleum resin obtained by copolymerizing a specific thermal cracked oil fraction having a low indene content and a high vinyltoluene content with a phenol compound and turpentine oil be blended in a hot melt adhesive composition.

This modified aromatic petroleum resin is a preferred petroleum resin for use in hot melt adhesive, with its excellent compatibility with base resins such as ethylene-vinyl acetate copolymer (hereinafter referred to as "EVA"). However, practical adhesive strength in a temperature range above a certain point is not sufficient, partly because commercially available turpentine oil with a low diene value is used, as described in the embodiment of the foregoing laid-open patent application.

During the packaging procedure of liquid products, for example, where they are filled in vessels such as cans or bottles immediately after production while hot, then packaged in containers such as corrugated fiberboard boxes, heat may transfer from the products to the containers. Hot melt adhesive, which gains adhesive strength by solidifying, including the one described in the foregoing laid-open patent application, may easily lose the adhesive strength when exposed to high temperatures. Therefore, the containers need to be allowed to cool for a while until the products become cold enough. This cooling time inevitably prolongs the production time. It is for this reason that improvement in adhesion resistance to heat when applied to substrates, particularly paper substrates such as corrugated fiberboards, is awaited. Improvement in adhesion resistance to heat is generally achieved by increasing the molecular weight of the resin. However, increased molecular weight may sacrifice adhesive properties, especially low temperature adhesion.

An object of the present invention is to improve the adhesion resistance to heat and heat stability of the modified aromatic petroleum resin described in the foregoing laid-open patent application, while maintaining the good hot melt adhesive properties thereof, especially the low temperature adhesion.

DISCLOSURE OF THE INVENTION

The inventors have found, after vigorous studies to improve the modified aromatic hydrocarbon resin described in the foregoing laid-open patent application, that the aforementioned problem can be solved by selecting turpentine oil with a specific diene value and by varying the indene and vinyltoluene contents from those described in the foregoing laid-open patent application.

Thus, the first mode of the present invention relates to a hot melt composition comprising:
(a) an ethylene copolymer resin: 100 weight parts;
(b) a modified aromatic petroleum resin having a weight-average molecular weight in a range of 500 to 2000 and produced by the copolymerization of (1) through (3) below using a Friedel-Crafts catalyst: 50 to 150 weight parts,
  (1) a polymerizable component of thermal cracked oil fraction obtained by the thermal cracking of petroleum hydrocarbons, composed primarily of components having boiling points in a range of 140 to 220° C. and containing vinyltoluene at a content of 10% or above and below 60% and indene at a content of 10 to,80%: 100 weight parts,
  (2) a turpentine oil having a diene value in a range of 15 to 60 cg/g: 10 to 40 weight parts, and
  (3) a phenol compound: 1 to 15 weight parts; and
(c) a wax: 10 to 100 weight parts.

The second mode of the present invention relates to a hot melt composition according to the first mode of the present invention, wherein a conjugated diolefin content in said thermal cracked oil fraction is 2.0% or below.

The third mode of the present invention relates to a hot melt composition according to the first mode of the present invention, wherein said ethylene copolymer resin is ethylene-vinyl acetate copolymer.

The fourth mode of the present invention relates to a modified aromatic petroleum resin for use in a hot melt composition having a weight-average molecular weight in a range of 500 to 2000 and produced by the copolymerization of (1) through (3) below using a Friedel-Crafts catalyst:
(1) a polymerizable component of thermal cracked oil fraction obtained by the thermal cracking of petroleum hydrocarbons, composed primarily of components having boiling points in a range of 140 to 220° C. and containing vinyltoluene at a content of 10% or above and below 60% and indene at a content of 10 to 80%: 100 weight parts,
(2) a turpentine oil having a diene value in the range of 15 to 60 cg/g: 10 to 40 weight parts, and
(3) a phenol compound: 1 to 15 weight parts.

BEST MODE FOR CARRYING OUT THE INVENTION

The present invention is described in more details below.

Base polymers for use in the hot melt composition according to the present invention may be thermoplastic rubber, such as block SBR (including ones partially hydrogenated), or (a) an ethylene copolymer resin, the latter being preferred. Examples of such (a) an ethylene copolymer resin include ethylene copolymers with one or more polar monomers which can copolymerize with ethylene, such as vinyl acetate or other vinyl esters of monocarboxylic acids, or acrylic or methacrylic acid or their esters with methanol, ethanol or other alcohols.

The desired polar monomer content in the ethylene copolymer resin may be 1 to 60 wt %, preferably 15 to 45 wt %. The melt index, an index to molecular weight, is preferably 10 to 1000 g/10 min (as measured under the conditions of 190° C., 2.16 kg load, 10 minutes). More preferable examples of ethylene copolymer include EVA and ethylene-ethyl acrylate copolymer.

The (b) modified aromatic petroleum resin for use in the present invention is produced from the thermal cracked oil fraction obtained by the thermal cracking of petroleum hydrocarbons, such as crude oil, kerosene, gas oil, naphtha, and butane. The fraction is composed primarily of components having boiling points in a range of 140 to 220° C., and contains vinyltoluene at a content of 10% or above and below 60%, preferably 10% or above and 55% or below, and indene at a content of 10 to 80%, preferably 15 to 80%, and, more preferably, further contains conjugated diolefins at a content of 2.0% or below.

Generally, the thermal cracked oil fraction consists of polymerizable and non-polymerizable components.

The polymerizable components are unsaturated polymerizable components of the thermal cracked oil fraction having boiling points in the above range, and include styrene and alkyl derivatives thereof, such as α-methylstyrene, β-methylstyrene and vinyltoluene; indene and alkyl derivatives thereof; and cyclopentadiene, methylcyclopentadiene, dicyclopentadiene and alkyl derivatives thereof. These polymerizable components usually account for 10 to 90 wt % of the thermal cracked oil fraction.

The non-polymerizable components account for the remaining portion of the thermal cracked oil fraction and consist primarily of saturated hydrocarbon compounds such as $c_9$ alkylbenzenes. In the present invention, these non-polymerizable components essentially do not contribute to polymerization, but work mostly as solvents.

In producing petroleum resin, polymerization can be controlled by adding non-polymerizable components consisting of saturated hydrocarbon compounds, such as $C_9$ alkylbenzenes, to adjust the proportion of the polymerizable components to 40 to 60 wt % (of the total feedstock including turpentine oil, phenol compound, etc.), as appropriate to attain desired viscosity or for other purposes.

Vinyltoluene content (%) herein shall refer to the proportion (wt %) of vinyltoluene to the polymerizable components (wt %) of the above thermal cracked oil fraction. Similarly, indene content (%) shall refer to the total proportion (wt %) of indene and alkyl derivatives thereof to the polymerizable components (wt %) of the above thermal cracked oil fraction. Also, conjugated diolefin content (%) shall refer to the total proportion (wt %) of cyclopentadiene and methylcyclopentadiene to the polymerizable components (wt %) of the above thermal cracked oil fraction. Note that the sum of vinyl toluene content, indene content, and conjugated diolefin content is 20% or above and below 100%.

The contents of these components are calculated based on their quantities, which can be determined by gas chromatography according to the standard procedure.

In the present invention, the thermal cracked oil fraction composed primarily of components having boiling points in the range of 140 to 220° C. is used as material. Components having boiling points below 140° C. are not recommended, as they contain large amounts of conjugated and non-conjugated diolefins and, therefore, result in resin of poor color tone and heat stability. On the other hand, resin produced from components having boiling points above 220° C. also exhibits poor color tone and heat stability, as well as inferior adhesion when used as hot melt adhesive.

It is also important to control the vinyltoluene and indene contents to the above ranges as specified in the present invention, so that the hot melt adhesive produced from the obtained resin provides improved adhesion resistance to heat.

Generally, the thermal cracked oil fraction used as material for the present invention may be easily obtained, simply by controlling the standard industrial distillation without superfractionation or multistage distillation in such a manner that the thermal cracked oil, which is the byproduct of the thermal cracking of petroleum hydrocarbons, is composed primarily of components having boiling points in the range of 140 to 220° C. Obviously, however, it may also be obtained through superfractionation or multistage distillation.

In the present invention, 100 weight parts of the polymerizable components of the thermal cracked oil fraction are blended and copolymerized with 10 to 40 weight parts of turpentine oil having a diene value in the range of 15 to 60 cg/g. Turpentine oil containing α-pinene, etc., as a primary component has a low diene value less than 15 cg/g. Such low diene values are not enough to improve the adhesion resistance to heat of the hot melt adhesive prepared from the obtained resin. On the other hand, diene values over 60 cg/g are also not recommended, as they would result in a decrease in the molecular weight of the obtained resin without improving in the adhesion resistance to heat.

The turpentine oil used herein is produced from the volatile component of the sap of coniferous trees. Industrially, it is roughly classified into four types by origin: gum turpentine, steam distilled wood turpentine, sulfate wood turpentine, and dry-distilled wood turpentine. Gum turpentine is produced by distilling the crude oleoresin of the pine, which is gathered from wounds or scars of live pine trees. Steam distilled wood turpentine, or wood turpentine, is produced by distilling the extract of intact pine stumps whose bark and sapwood have decayed off. Sulfate wood turpentine, or sulfate turpentine, is produced by condensing the vapor generated during the heating process of paper manufacturing, where kraft (sulfate) is pulped. Dry-distilled wood turpentine is produced from the light distillate obtained by the dry distillation (carbonization) of wasted coniferous trees, such as oleoresinous or trimmed trees. Usually, they are further distilled before use. Although precise compositions are not available as they are of natural origin, any type may be used provided that the diene value falls in the range of 15 to 60 cg/g.

Examples of turpentine oil having a diene value in the range of 15 to 60 cg/g include the fraction having boiling points as at atmospheric pressure in the range of 150 to 200° C., preferably 165 to 185° C., which has been purified by the vacuum distillation of crude sulfate turpentine fraction; isomerized products of crude sulfate turpentine; and isomerized products of α-pinene, β-pinene, etc., and the mixtures thereof. Turpentine oil with a low diene value or a specific diene value also may be used once it is isomerized, as appropriate, to attain a diene value in the specified range.

The isomerization may be performed by the standard thermal isomerization, where heat is used for reaction. In practice, however, isomerization is a complicated process accompanied by other reactions such as thermal decomposition and rearrangement. For example, the diene values of crude sulfate turpentine, α-pinene, etc., can be improved via thermal isomerization in a gaseous phase at atmospheric pressure, 200 to 400° C., preferably 250 to 350° C., or more preferably 315 to 325° C., using a stainless tube reactor. Then, vacuum distillation may be performed as necessary to obtain the desired isomers. In thermal isomerization, the diene value may be understood as an index to the degree of isomerization.

Turpentine oil having a diene value in the range of 15 to 60 cg/g, 10 to 40 weight parts, is polymerized with the polymerizable components of the thermal cracked oil fraction, 100 weight parts. A proportion below 10 weight parts would result in poor compatibility with the base polymer, while that above 40 weight parts would fail to improve adhesion because of a decreased softening point of the resin.

In the present invention, 100 weight parts of the polymerizable components of the thermal cracked oil fraction is further added with 1.0 to 15 weight parts of a phenol compound. A phenol compound herein shall refer to phenol and alkyl-substituted phenols such as creosol and xylenol. These compounds may be used in combination. A proportion below 1.0 weight part would result in poor compatibility with the base polymer while that above 15 weight parts would decrease the softening point of the resin, failing to improve adhesion in either case.

For polymerization, 0.05 to 5.0 wt % Friedel-Crafts catalyst is used. Preferable Friedel-Crafts catalysts include aluminum chloride and boron trifluoride gas, as well as their complexes with water, ethers, phenols, alcohols, etc., such as boron trifluoride phenolate. Note that the phenol compound contained in complex catalyst, although in small amounts, should be included in the amount of phenol compound as specified above.

The temperature and time for polymerization are not specified; for example, polymerization may take place at 0 to 80° C. for 0.1 to 10 hours. After polymerization, the catalyst is removed by neutralization, followed by distillation as appropriate to produce modified aromatic petroleum resin having a weight-average molecular weight in the range of 500 to 2000.

The ratio of blending is 50 to 150 weight parts of the (b) modified aromatic hydrocarbons per 100 weight parts of the (a) ethylene copolymer resin.

For the (c) wax, paraffin wax, petroleum wax such as microcrystalline wax, natural wax, polyethylene wax, polypropylene wax, atactic polypropylene wax, sasol wax, etc., may be used as appropriate according to the objective. The ratio of blending is 10 to 100 weight parts per 100 weight parts of the (a) ethylene copolymer resin.

Mixing and melting of the (a) ethylene copolymer resin, the (b) modified aromatic hydrocarbons, and the (c) wax according to the standard procedure will provide the hot melt composition of the present invention.

The hot melt composition according to the present invention may be used as hot melt coating, printing ink, adhesive, and sealant. The most preferred usage is hot melt adhesive. The modified aromatic petroleum resin according to the present invention may also preferably be used for these purposes. Applications as hot melt adhesive include those to various substrates, such as paper, plastics, aluminum, and other metals. The most preferred substrates are corrugated fiberboard and other paper substrates. Applications as hot melt sealant include those in wooden structures and book binding.

Also, depending on the application, such as adhesive or sealant, common application-specific compounding agents may be blended in appropriate amounts, for example, filler such as calcium carbonate, titanium oxide, talc or clay, plasticizer, organic or inorganic pigments, antioxidant, and polymerization inhibitor.

[EXAMPLES]

The present invention is described in more details by referring to specific examples. The test methods adopted in the examples and references are as follows:

(Test Methods)
(1) Measurement of Diene Value

A 5 g sample of turpentine oil is mixed with a specified amount of maleic anhydride solution in toluene, and boiled for reaction with reflux. After the reaction is completed, the product is extracted with a specified amount of water and titrated with sodium hydroxide (1 N), using phenolphthalein as an indicator. A blank test is also performed in the same manner except that no sample is used. The diene value of the turpentine oil sample is obtained by subtracting the analytic value from the blank test result.

(2) Weight-Average Molecular Weight

The weight-average molecular weight of the petroleum resin is measured by GPC, using the following column and measurement conditions:

Column: TSK-Gel G-4000+2000Hs

Measurement conditions

Temperature: 38° C.

Pressure: 60 kg/cm$^2$

Rate of flow: 1.0 ml/min

Solvent: tetrahydrofuran (THF)

(3) Thermal Stability Test

Hot melt adhesive, 50 g, which has been obtained at the specified blending ratio to be described later, is placed in a 100 ml beaker, and heated at 180° C. for 72 hours. After cooled to solid, it is visually examined for any skinning and carbide generation according to the criteria given below.

Skinning herein shall refer to the superficial gelation of hot melt adhesive caused by heating. Also, carbides shall refer to the black matter observed in the hot melt adhesive at the bottom of the beaker. Both of them are indispensable heat stability test items as they lead to nozzle choking in a hot melt adhesive applicator.

Criteria Skinning

◎: none o: slight x: extensive

Carbides

◎: none o: slight x: extensive (4) Adhesion Resistance to Heat

Two strips of K-liner B-flute corrugated fiberboard (220 g/m$^2$), 25 mm in width and 100 mm in length, are used. The hot melt adhesive, which has been obtained at the specified blending ratio to be described later, is applied to the surface of one strip in the widthwise direction (perpendicular to the flutes). The strip is then bonded to the backside of the other, with their flutes paralleled, according to the conditions specified below.

Using thus prepared specimen, a shear creep test is performed under 1 kg load at 60° C., to measure the time to drop by failure at the bond of the specimen. The adhesion resistance to heat is reported as time (hr).

Bonding conditions

Temperature at application: 180° C.

Quantity of application: 3 g/m (0.075 g/25 mm)

Open time: 2 sec

Load: 2 kg

Duration: 2 sec (5) Low Temperature Adhesion

Strips of K-liner B-flute corrugated fiberboard (220 g/m$^2$), 50 mm in width and 100 mm in length, are used. The hot melt adhesive, which has been obtained at the specified blending ratio to be described later, is applied to the surface of the strip in the widthwise direction (parallel to the flutes). The strip is then bonded to backside of another strip, with the flutes crossing, according to the conditions described in "(4) Adhesion resistance to heat."

Using thus prepared specimen, an L-peel test is performed on its bond under the specified low temperature condition. The failure mode of the specimen is examined according to the following criteria:

Criteria

◎: substrate failure o: chiefly substrate failure

Δ: chiefly adhesive failure x: adhesive failure (Production of Turpentine Fraction—Case 1)

Crude sulfate turpentine was vacuum-distilled in a glass distillation column (inside diameter: 25 mm; length: 500 mm) with a stainless steel dexon packing (diameter: 3 mm) to obtain turpentine fraction t1 (boiling point as at atmospheric pressure: 165 to 185° C.) having a diene value of 32 cg/g.

(Production of Turpentine Fraction—Case 2)

Crude sulfate turpentine was thermally isomerized in a gaseous phase at atmospheric pressure using a stainless steel tube reactor to produce turpentine oil isomers. The reactor (inside diameter: 14 mm; length 500 mm), vertically placed and filled with stainless steel filler, was heated in a cylindrical electric oven. A thermocouple was placed in the reactor to monitor its temperature. A narrow-spaced preheating tube was provided at the inlet of the reactor to preheat the crude sulfate turpentine to its evaporating temperature as it is supplied continuously into the reactor through the preheating tube by a constant-flow pump. The reaction took place at 320±5° C. The crude product obtained in the reactor was discharged from the outlet of the reactor, cooled to condense, and captured in a sealed 1000 ml round bottom flask, which was filled with nitrogen to protect the product from oxidation. After 100 to 1000 ppm antioxidant was added to the crude product, it was vacuum-distilled using the same distiller as in case 1 to obtain turpentine fraction t2 (boiling point as at atmospheric pressure: 165 to 185° C.) having a diene value of 45 cg/g.

(Example 1)

The thermal cracked oil fraction of the following composition having boiling points in the range of 140 to 220° C., which was obtained by the thermal cracking of petroleum, was used as raw material oil (a):

Polymerizable components (wt %): 70.0

Total content of cyclopentadiene and methylcyclopentadiene (wt %): 0.3

Content of vinyltoluene (wt %): 30.1

Total content of indene and alkyl derivatives thereof (wt %): 29.3

Content of conjugated diolefins (wt %): 0.4

Content of vinyltoluene (%): 43.0

Content of indene (%): 42.0

The polymerizable components of this raw material oil (a), 100 weight parts, were mixed with the turpentine fraction t1 having a diene value of 32 cg/g obtained in case 1, 23 weight parts, and phenol, 5 weight parts, then with $C_9$ alkylbenzenes, to adjust the total content of the polymerizable components to 50 wt % of the total feedstock. After 0.2 wt % of boron trifluoride phenolate was added, polymerization took place at 20° C. for 3 hours. The catalyst was neutralized by hydrated lime and filtered out. The remaining unreacted oil and oligomers were distilled out to produce resin (A) having a weight-average molecular weight of 1350.

The resin (A), 40 weight parts, was melted and mixed with EVA (Mitsui DuPont Chemical Co., Tradename: EVAFLEX #210, vinyl acetate content: 28 wt %; melt index: 400), 40 weight parts, and paraffin wax (Nippon Oil Co., Ltd., melting point: 155° F.), 20 weight parts, at approximately 180° C. according to the standard procedure, to prepare a hot melt composition, which was then tested for heat stability and low temperature adhesion.

(Example 2)

The thermal cracked oil fraction of the following composition having boiling points in the range of 140 to 220° C., which was obtained by the thermal cracking of petroleum, was used as raw material oil (b):

Polymerizable components (wt %): 74.6

Total content of cyclopentadiene and methylcyclopentadiene (wt %): 1.4

Content of vinyltoluene (wt %): 13.0

Total content of indene and alkyl derivatives thereof (wt %): 50.2

Content of conjugated diolefins (%): 1.9

Content of vinyltoluene (%): 17.4

Content of indene (%): 50.2

The polymerizable components of this raw material oil (b), 100 weight parts, were mixed with the turpentine fraction t1 having a diene value of 32 cg/g obtained in case 1, 23 weight parts, and phenol, 5 weight parts, then with $C_9$ alkylbenzenes, to adjust the total content of the polymerizable components to 50 wt %. Polymerization took place under the same conditions as in example 1, to produce resin B having a weight-average molecular weight of 1550.

Then, a hot melt composition was prepared in the same manner as in example 1, and tested for hot melt adhesive characteristics.

(Example 3)

The thermal cracked oil fraction of the following composition having boiling points in the range of 140 to 220° C., which was obtained by the thermal cracking of petroleum, was used as raw material oil (c):

Polymerizable components (wt %): 58.9

Total content of cyclopentadiene and methylcyclopentadiene (wt %): 0.3

Content of vinyltoluene (wt %): 28.7

Total content of indene and alkyl derivatives thereof (wt %): 12.6

Content of conjugated diolefins (%): 0.5

Content of vinyltoluene (%): 49.0

Content of indene (%): 21.5

The polymerizable components of this raw material oil (c), 100 weight parts, were mixed with the turpentine fraction t2 having a diene value of 45 cg/g obtained in case 2, 23 weight parts, and phenol, 5 weight parts, then with $C_9$ alkylbenzenes, to adjust the total content of the polymerizable components to 50 wt %. Polymerization took place under the same conditions as in example 1, to produce resin C having a weight-average molecular weight of 1200.

Then, a hot melt composition was prepared in the same manner as in example 1, and tested for hot melt adhesive characteristics.

(Comparative Example 1)

The thermal cracked oil fraction of the following composition having boiling points in the range of 140 to 220° C., which was obtained by the superfractionation of thermal cracked petroleum oil in a two-stage distiller, was used as raw material oil (d):

Polymerizable components (wt %): 57.1

Total content of cyclopentadiene and methylcyclopentadiene (wt %): 0.1

Content of vinyltoluene (wt %): 31.1

Total content of indene and alkyl derivatives thereof (wt %): 5.8

Content of conjugated diolefins (%): 0.2

Content of vinyltoluene (%): 54.5

Content of indene (%): 8.8

The polymerizable components of this raw material oil (d), 100 weight parts, were mixed with commercially available turpentine oil t3 (α-pinene: 90 wt %; β-pinene: 5 wt %; other constituents: 5 wt %) having a diene value of 7 cg/g, 23 weight parts, and phenol, 5 weight parts, then with $C_9$ alkylbenzenes, to adjust the total content of the polymerizable components to 50 wt %. Polymerization took place under the same conditions as in example 1, to produce resin D having a weight-average molecular weight of 1050.

Then, a hot melt composition was prepared in the same manner as in example 1, and tested for hot melt adhesive characteristics.

(Comparative Example 2)

The raw material oil (c) described above, 100 weight parts, was mixed with the commercially available turpentine oil t3 described in reference 1 having a diene value of 7 cg/g, 23 weight parts, and phenol, 5 weight parts, then with $C_9$ alkylbenzenes, to adjust the total content of the polymerizable components to 50 wt %. After an additional 2 weight parts of phenol was added, polymerization took place under the same conditions as in example 1, to produce resin E having a weight-average molecular weight of 1130.

Then, a hot melt composition was prepared in the same manner as in example 1, and tested for resin compatibility and hot melt adhesive characteristics.

Table 1 shows the test results for the compatibility of the resins obtained in examples 1 through 3 and references 1 and 2, as well as the adhesive characteristics of the resulting hot melt compositions:

[TABLE 1]

Characteristics of Modified Aromatic Petroleum Resins and Hot Melt Compositions Therefrom

| | | | Examples | | | Comparative Examples | |
|---|---|---|---|---|---|---|---|
| | | | 1 | 2 | 3 | 1 | 1 |
| Crude oil composition (weight parts) | Thermal cracked oil fraction | a (polymerizable components) | 100 | | | | |
| | | b (polymerizable components) | | 100 | | | |
| | | c (polymerizable components) | | | 100 | | 100 |
| | | d (polymerizable components) | | | | 100 | |
| | Turpentine oil | t1 (diene value: 32 cg/g) | 23.0 | 23.0 | | | |
| | | t2 (diene value: 45 cg/g) | | | 23.0 | | |
| | | t3 (diene value: 7 cg/g) | | | | 23.0 | 23.0 |
| | Phenol | | 5.0 | 5.0 | 5.0 | 5.0 | 5.0 |
| Characteristics of petroleum resin and hot melt composition | Modified aromatic petroleum resin | | Resin A | Resin B | Resin C | Resin D | Resin E |
| | Weight-average molecular weight | | 1350 | 1550 | 1200 | 1050 | 1130 |
| | Heat stability | Skinning | ◯ | ◯ | ◯ | ◯ | ◯ |
| | | Carbides | ⊙ | ⊙ | ⊙ | ⊙ | ⊙ |
| | Adhesion resistance to heat (hr) | | 4.5 | 6.0 | 2.5 | 0.5 | 1.0 |
| | Low temperature adhesion | 10 (° C.) | ⊙ | ⊙ | ⊙ | ⊙ | ⊙ |
| | | 5 (° C.) | ⊙ | ⊙ | ⊙ | ⊙ | ⊙ |
| | | 0 (° C.) | ◯ | ◯ | ◯ | ◯ | ◯ |

Note that the petroleum resins used in comparative examples 1 and 2 are equivalent to those used in example 1 and comparative example 1, respectively, of the foregoing laid-open patent application.

Table 1 clearly shows that the hot melt compositions according to the present invention have, as compared to those produced from the petroleum resins described in the foregoing laid-open patent application, superior adhesive characteristics, particularly adhesion resistance to heat, as applied to paper substrates such as corrugated fiberboard, while maintaining comparably high heat stability and low temperature adhesion.

INDUSTRIAL APPLICABILITY

The hot melt composition according to the present invention has excellent heat stability and improved adhesion resistance to heat. Specific applications of the hot melt composition according to the present invention include hot melt coating, printing ink, adhesive, and sealant. Application to hot melt adhesive, for example, is particularly effective when the substrate is corrugated fiberboard or other paper substrates.

Also, the modified aromatic petroleum resin according to the present invention is a preferable resin for said hot melt applications, especially for use in hot melt adhesive.

What is claimed is:

1. A hot melt composition comprising:
   (a) an ethylene copolymer resin: 100 weight parts;
   (b) a modified aromatic petroleum resin having a weight-average molecular weight in the range of 500 to 2000 and produced by the copolymerization of components (1) through (3) below using a Friedel-Crafts catalyst: 50 to 150 weight parts;
      (1) a polymerizable component of a thermal cracked oil fraction obtained by the thermal cracking of petroleum hydrocarbons, said fraction being composed primarily of components having boiling points in the range of 140° C. to 220° C. and containing vinyltoluene at a content of 10% by weight or above and below 60% by weight and indene at a content of 10 to 80% by weight: 100 weight parts,
      (2) a turpentine oil having a diene value in the range of 15 to 60 cg/g: 10 to 40 weight parts, and
      (3) a phenol, alkyl substituted phenol, or mixtures thereof: 1 to 15 weight parts; and
   (c) a wax: 10 to 100 weight parts.

2. A hot melt composition according to claim 1, wherein the conjugated diolefin content in said thermal cracked oil fraction is 2.0% by weight or less.

3. A hot melt composition according to claim 1, wherein said ethylene copolymer resin is ethylene-vinyl acetate copolymer.

4. A modified aromatic petroleum resin for use in a hot melt composition, having a weight-average molecular weight in the range of 500 to 2000 and produced by the copolymerization of components (1) through (3) below using a Friedel-Crafts catalyst:
   (1) a polymerizable component of a thermal cracked oil fraction obtained by the thermal cracking of petroleum hydrocarbons, said fraction being composed primarily of components having boiling points in the range of 140° C. to 220° C. and containing vinyltoluene at a content of 10% by weight or above and below 60% by weight and indene at a content of 10 to 80% by weight: 100 weight parts,
   (2) a turpentine oil having a diene value in the range of 15 to 60 cg/g: 10 to 40 weight parts, and
   (3) a phenol, alkyl substituted phenol, or mixtures thereof: 1 to 15 weight parts.

5. A hot melt composition according to claim 1 wherein said polymerizable component comprises styrene and alkyl derivatives of styrene.

6. A hot melt composition according to claim 1 wherein said polymerizable component comprises unsaturated polymerizable compounds.

7. A hot melt composition as claimed in claim 1, wherein said thermal cracked oil fraction comprises from 10 to 90% by weight of polymerizable components.

8. A hot melt adhesive composition as claimed in claim 1, wherein the vinyltoluene content is less than 55 % by weight.

9. A hot melt adhesive composition as claimed in claim 1, wherein the indene content is greater than 15% by weight.

10. A modified aromatic petroleum resin having a weight average molecular weight in the range of 500 to 2000, and being produced by polymerizing:
    (1) 100 parts by weight of unsaturated polymerizable components having boiling points in the range of 140° C. to 220° C. and comprising vinyltoluene and indene,
    (2) 10 to 40 parts by weight of a turpentine oil having a diene value in the range of 15 to 60 cg/g, and
    (3) 1 to 15 parts by weight of a phenol, alkyl substituted phenol, or mixtures thereof.

11. A hot melt composition comprising a modified aromatic petroleum resin as claimed in claim 10.

12. A hot melt composition comprising
    (a) 100 parts by weight of an ethylene copolymer resin,
    (b) 50 to 150 parts by weight of a modified aromatic petroleum resin as claimed in claim 10, and
    (c) 10 to 100 parts by weight of a wax.

13. A hot melt composition comprising:
    (a) 100 parts by weight of an ethylene copolymer resin,
    (b) 50 to 150 parts by weight of a modified aromatic petroleum resin, said resin having a weight average molecular weight in the range of 500 to 2000 and produced by admixing:
       (1) 100 parts by weight of a thermal cracked oil fraction obtained by the thermal cracking of petroleum hydrocarbons and comprising components having boiling points in the range of 140° C. to 220° C.,
       (2) 10 to 40 parts by weight of a turpentine oil, and
       (3) 1 to 15 parts by weight of a phenol compound selected from the group consisting of phenol, alkyl substituted phenol and mixtures thereof, and polymerizin polymerizable components of said thermal cracked oil fraction with said turpentine oil, and said phenol compound using a Friedel-Crafts catalyst, and
    (c) 10 to 100 parts by weight of wax,
    wherein said thermal cracked oil fraction comprises vinyltoluene at a content of 10% by weight or above and below 60% by weight, and indene at a content of 10% by weight to 80% by weight, and
    said turpentine oil has a diene value in the range of 15 to 60 cg/g.

14. A hot melt composition as claimed in claim 13 wherein said phenol compound is selected from phenol, creosol, xylenol and mixtures thereof.

* * * * *